United States Patent
Lee et al.

(10) Patent No.: US 12,456,333 B2
(45) Date of Patent: Oct. 28, 2025

(54) TRAFFIC HAND SIGNAL DETECTION SYSTEM AND METHOD THEREOF

(71) Applicant: GWANGJU INSTITUTE OF SCIENCE AND TECHNOLOGY, Gwangju (KR)

(72) Inventors: Yong Gu Lee, Gwangju (KR); Tae Seung Baek, Gwangju (KR)

(73) Assignee: GWANGJU INSTITUTE OF SCIENCE AND TECHNOLOGY, Gwangju (KR)

(*) Notice: Subject to any disclaimer, the term of this patent is extended or adjusted under 35 U.S.C. 154(b) by 303 days.

(21) Appl. No.: 17/994,558

(22) Filed: Nov. 28, 2022

(65) Prior Publication Data
US 2023/0169797 A1 Jun. 1, 2023

(30) Foreign Application Priority Data
Nov. 29, 2021 (KR) .......................... 10-2021-0167331

(51) Int. Cl.
*G06V 40/00* (2022.01)
*G06V 10/764* (2022.01)
*G06V 20/56* (2022.01)
*G06V 40/20* (2022.01)

(52) U.S. Cl.
CPC ............ *G06V 40/28* (2022.01); *G06V 10/764* (2022.01); *G06V 20/56* (2022.01)

(58) Field of Classification Search
CPC ...... G06V 40/28; G06V 10/764; G06V 20/56; G06V 40/20; G06V 10/82; G06V 20/582; G08G 1/0962
See application file for complete search history.

(56) References Cited

U.S. PATENT DOCUMENTS

| | | | |
|---|---|---|---|
| 11,557,150 B2* | 1/2023 | Kraft | G06V 40/28 |
| 2013/0271584 A1* | 10/2013 | Wexler | G06V 40/28 348/62 |
| 2020/0160699 A1* | 5/2020 | Annapureddy | B60W 40/04 |
| 2021/0309218 A1* | 10/2021 | Hashimoto | B60W 30/09 |
| 2021/0357662 A1* | 11/2021 | Hartmann | G06F 18/40 |
| 2021/0397885 A1* | 12/2021 | Sivaraman | G06V 10/764 |
| 2021/0402942 A1* | 12/2021 | Torabi | G06N 3/02 |
| 2022/0041105 A1* | 2/2022 | Jochmann | G06V 10/243 |
| 2022/0198180 A1* | 6/2022 | Weaver | G06F 3/017 |
| 2023/0169797 A1* | 6/2023 | Lee | G06V 10/764 382/104 |
| 2023/0186644 A1* | 6/2023 | Jagbrant | G06V 10/82 382/104 |

* cited by examiner

Primary Examiner — Md K Talukder
(74) Attorney, Agent, or Firm — Hauptman Ham, LLP

(57) ABSTRACT

A traffic hand signal detection system includes: an imaging unit configured to acquire a photographed image from a camera photographing a predetermined range; an image classifier configured to classify an arm motion from the photographed image provided from the imaging unit by imparting a class; a detection module configured to detect the arm motion from the photographed image classified by the image classifier and generate a traffic hand signal sequence converted into a number; and an analysis module configured to receive the traffic hand signal sequence converted into the number from the detection module and determine a type of a traffic hand signal.

12 Claims, 11 Drawing Sheets

FIG. 11

| frames | input sequence | output |
|---|---|---|
| t = 0 | 00000000000000000000000000000000000000000 | inactive |
| t = 1 | 00000000000000000000000000000000000000000 | inactive |
| t = 2 | 00000000000000000000000000000000000000000 | inactive |
| t = 3 | 00000000000000000000000000000000000000000 | inactive |
| ⋮ | ⋮ | ⋮ |
| t = k | 000000000000000000001111111111155555555555 | inactive |
| t = k+1 | 00000000000000000000111111111115555555555 | inactive |
| ⋮ | ⋮ | ⋮ |
| t = n-1 | 111111111115555555555522222222220000000 | go |
| t = n | 11111111155555555555222222222220000000 | go |

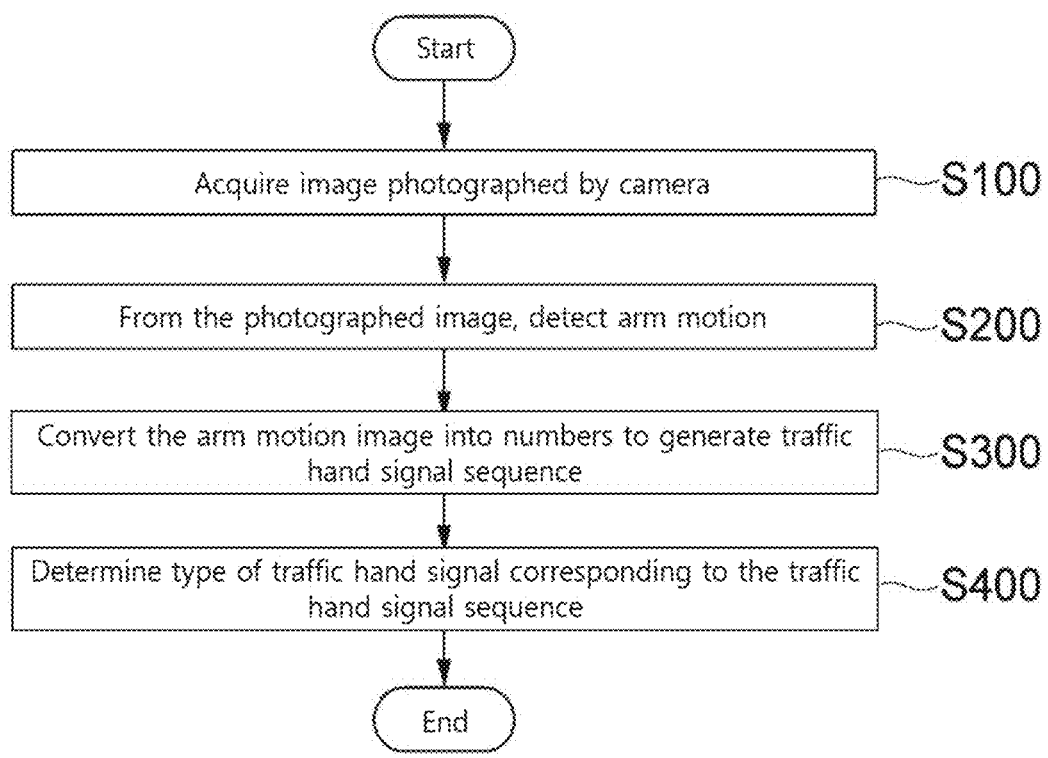

TRAFFIC HAND SIGNAL DETECTION SYSTEM AND METHOD THEREOF

CROSS-REFERENCE TO RELATED APPLICATION

This application claims priority to Korean Patent Application No. 10-2021-0167331, filed on Nov. 29, 2021, and all the benefits accruing therefrom under 35 U.S.C. § 119, the content of which in its entirety is herein incorporated by reference.

BACKGROUND

1. Field

Embodiments of the present disclosure relates to a traffic hand signal detection system and a traffic hand signal detection method using the same, and more particularly, to a traffic hand signal detection system capable of determining a signal indicated by a traffic hand signal based on information about the traffic hand signal in an image photographed by a camera, and a traffic hand signal detection method using the same.

2. Description of the Related Art

Recently, companies such as Tesla and Waymo are spurring the development of autonomous driving technology, and interest in autonomous driving is increasing around the world. Autonomous driving refers to driving without human intervention, such as a vehicle planning a route to a destination and avoiding obstacles while driving while recognizing the surrounding environment. The U.S. Society of Automotive Engineers (SAE) classified autonomous driving into five levels. The levels are classified according to the degree of driver intervention. As the level increases, there is less driver intervention, and the role of autonomous driving systems increases. The system recognizes the surrounding environment with sensors such as cameras, RADAR, LiDAR, and GPS. From level 4, where the driver does not intervene, the system should be able to operate on a variety of roads and conditions. In order for fully autonomous driving to be possible, it should be possible to recognize and follow traffic hand signals when traffic lights and hand signals overlap. The hand signals of the traffic police are used to deal with traffic light failures or control traffic volume. Under the Road Traffic Act, when a traffic light and a hand signal overlap, the hand signal has priority. Accordingly, technology to recognize and interpret hand signals is essential.

The development of a hand signal recognition technology based on the police hand has been attempted several times. After image-based detection, J. wiederer tried to recognize hand signals using RNN, GRU, LSTM, and the like by extracting motions using 3D pose estimation. V. Neeraj divided an image into six regions and interpreted the corresponding hand signals when a hand was photographed in that region. Quoc recognized human body parts using depth images. After that, he tried to interpret the hand signal by labeling the hand signal image with skeletal joints and learning an angle of each joint. R. Sathya applied frame differencing when acquiring successive images. After this, he set up a region of interest (RoI) and then tried to classify the hand signals by extracting CBIV features. F. Guo developed an algorithm for recognizing the policeman's hand signals by extracting the policeman's body and arms using dark channel prior and kernel density estimation, and then using a difference in coordinate values of the policeman's arms. Jian tried camera-based gesture recognition using Convolution Pose Machine and LSTM specialized in motion recognition. In addition, Chunyong developed a traffic hand signal recognition algorithm by constructing a skeleton dataset and analyzing a position change of skeleton points using ST-CNN. Cai developed a hand signal recognition algorithm using a skeleton dataset based on a RGB-D depth sensor, and partially changed a structure of the skeleton to facilitate feature extraction through the neural network. Chaojun developed an algorithm to recognize hand signals by tracking hand signal motions in successive frames using a Lucas-Kanade optical flow method other than skeleton. Guan tried to increase a recognition rate of police hand signals by applying two faster R-CNN models individually for color and depth in order to solve the phenomenon that the recognition rate of the existing faster R-CNN fell in a complex background. There was also a study using an accelerometer rather than a vision-base. Ben developed an algorithm by attaching an accelerometer to each hand of a police officer performing hand signal motions and using a change in acceleration of each motion. There are also several algorithms that try to interpret the signal using a pointer rather than a hand signal. Yoon detected a foremen and a traffic wand based on yolov3, normalized a change in size and location of a bounding box, and then trained with RNN to interpret the signal. Aulia attempted to detect a wand's signal after being determined whether the foremen performs a signal or not based on the 3D CNN.

However, such a conventional method exposes a limitation that requires a large amount of computation, such as recognizing a motion by extracting a depth image-based region or imparting a skeleton in a limited situation or using an acceleration sensor.

It is to be understood that this background of the technology section is intended to provide useful background for understanding the technology and as such disclosed herein, the technology background section may include ideas, concepts or recognitions that were not portion of what was known or appreciated by those skilled in the pertinent art prior to a corresponding effective filing date of subject matter disclosed herein.

SUMMARY

Embodiments of the invention are directed to a traffic hand signal detection system and a traffic hand signal detection method using the same, capable of determining a signal indicated by a traffic hand signal based on information on the traffic hand signal in an image photographed by a camera.

According to an embodiment, a traffic hand signal detection system includes: an imaging unit configured to acquire a photographed image from a camera photographing a predetermined range; an image classifier configured to classify an arm motion from the photographed image provided from the imaging unit by imparting a class; a detection module configured to detect the arm motion from the photographed image classified by the image classifier and generate a traffic hand signal sequence converted into a number; and an analysis module configured to receive the traffic hand signal sequence converted into the number from the detection module and determine a type of a traffic hand signal.

In some embodiments, the detection module may include: an arm motion detector configured to detect an arm motion performed by a hand signal performer in a photographed image sequence classified by the image classifier; and an arm motion number converter configured to convert the class of the detected arm motion image into the number.

In some embodiments, the detection module may further include a traffic hand signal sequence adjustor configured to generate the traffic hand signal sequence as a combination of numbers representing a class of an arm direction image.

In some embodiments, the traffic hand signal sequence adjustor may randomly generate the class of the arm direction image within a predetermined range and add it to or delete it from the traffic hand signal sequence.

In some embodiments, the analysis module may include: a traffic hand signal learning unit configured to learn the traffic hand signal sequence converted into the number; and a traffic hand signal determinator configured to receive the traffic hand signal sequence and determine the type of the traffic hand signal.

In some embodiments, the traffic signal learning unit may be one of Vanilla RNN, LSTM, GRU and LSTM GRU.

In some embodiments, when a probability value of the traffic hand signal is 0.4 or more, the traffic hand signal determinator may determine it as a corresponding traffic hand signal.

In some embodiments, the traffic hand signal determinator may include a fully connected layer and a softmax.

In some embodiments, the analysis module may further include a database configured to store information about the photographed traffic hand signal sequence image, the arm direction image extracted from the photographed image, and the traffic hand signal sequence expressed in the number.

According to an embodiment, a traffic hand signal detection method includes: an image acquiring step of acquiring a photographed image from a camera photographing a predetermined range; an image classifying step of classifying types of arm motions from the photographed image acquired in the image acquiring step; a detecting step of detecting an arm direction motion from the classified image and generating a traffic hand signal sequence converted into a number; and an analysis step of determining a type of a traffic hand signal corresponding to the traffic hand signal sequence converted into the number based on information detected in the detecting step.

In some embodiments, the detecting step may further include adding or deleting an arbitrary traffic hand signal sequence to the converted traffic hand signal sequence.

In some embodiments, the detecting step may include learning the traffic hand signal sequence converted into the number.

In some embodiments, in the analysis step, when using the traffic hand signal sequence as an input, if a signal is substantially equal to or more than a threshold value, the signal may be determined as the traffic hand signal.

According to one or more embodiments of the present disclosure, a traffic hand signal detection system and a traffic hand signal detection method using the same may determine a signal indicated by a traffic hand signal based on information on the traffic hand signal in an image photographed by a camera, such that even if a driver is negligent, information about the signal indicated by the traffic hand signal may be provided, and an autonomous vehicle may also recognize the signal indicated by the traffic hand signal.

BRIEF DESCRIPTION OF THE DRAWINGS

The above and other features and aspects of the present disclosure of disclosure will be more clearly understood from the following detailed description taken in conjunction with the accompanying drawings, in which:

FIG. 11 is an example illustrating a sequence input to the traffic hand signal learning unit and an output according to the order of time.

FIG. 13 is a flowchart illustrating a traffic hand signal detection method using the traffic hand signal detection system 100 of the present disclosure.

DETAILED DESCRIPTION

Figure 1:
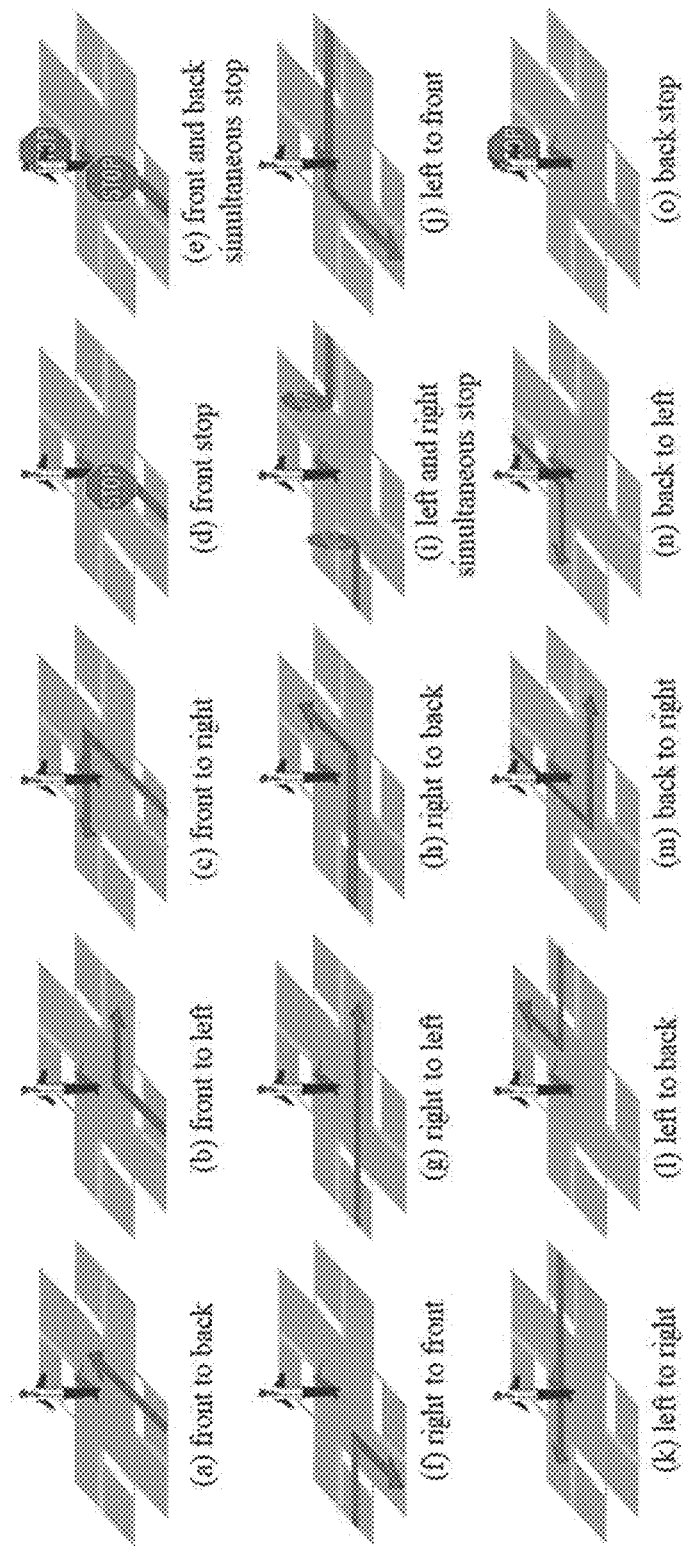
FIG. 1 is a conceptual diagram illustrating types of traffic hand signals.

Hereinafter, a vehicle hand signal detection system and a vehicle hand signal detection method according to an embodiment of the present disclosure will be described in detail with reference to the accompanying drawings. Since the present disclosure may have various changes and may have various forms, specific embodiments are illustrated in the drawings and described in detail in the description. However, this is not intended to limit the present disclosure to the specific disclosed form, and it should be understood to include all modifications, equivalents and substitutes included in the spirit and scope of the present disclosure. In describing each figure, like reference numerals have been used for like elements. In the accompanying drawings, the dimensions of the structures are enlarged than the actual size for clarity of the present disclosure.

Terms such as first, second, and the like may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component.

The following embodiments are detailed descriptions to help the understanding of the present disclosure, and do not limit the scope of the present disclosure. Accordingly, an invention of the same scope performing the same function as the present disclosure will also fall within the scope of the present disclosure.

The terms used in the present disclosure are only used to describe specific embodiments, and are not intended to limit the present disclosure. The singular expression includes the plural expression unless the context clearly dictates otherwise. In the present disclosure, terms such as "include (comprise)" or "have" are intended to designate that a feature, number, step, operation, component, part, or combination thereof described in the specification is present, but it is to be understood that it does not preclude the possibility of the presence or addition of one or more other feature, number, step, operation, component, part, or combination thereof.

Unless defined otherwise, all terms used herein, including technical or scientific terms, have the same meaning as commonly understood by one of ordinary skill in the art to which this invention belongs. Terms such as those defined in a commonly used dictionary should be interpreted as having a meaning consistent with the meaning in the context of the related art, and should not be interpreted in an ideal or excessively formal meaning unless explicitly defined in the present disclosure.

In general, a traffic hand signal means a signal performed by a hand signal performer to control an amount of traffic on the road and is specified by law. According to the curriculum for hand signals for out-of-office police officers in the Central Police Academy, there are 10 hand signals used by the police for traffic control. However, referring to FIG. 1, in order to apply a hand signal in an actual road situation, a total of 15 hand signals may be defined by adding five types to the existing hand signal types. The name of the traffic signal is based on that a direction in which the police are facing is the front. In the case of front to back illustrated in FIG. 1 (a), it means a signal for the police to send a vehicle in front of the police to the back of the police. In addition, in the case of right to front in FIG. 1 (f), it means a signal that the police send a vehicle located on the right side of the police to the front of the police.

A traffic hand signal motion consists of a combination of 2 to 4 motions. All signals, except for a stop signal simply raising the arm diagonally in the corresponding direction, are combined into motions that points to a target of the signal with the arm and then move and point the arm in a next moving direction.

Figure 2:
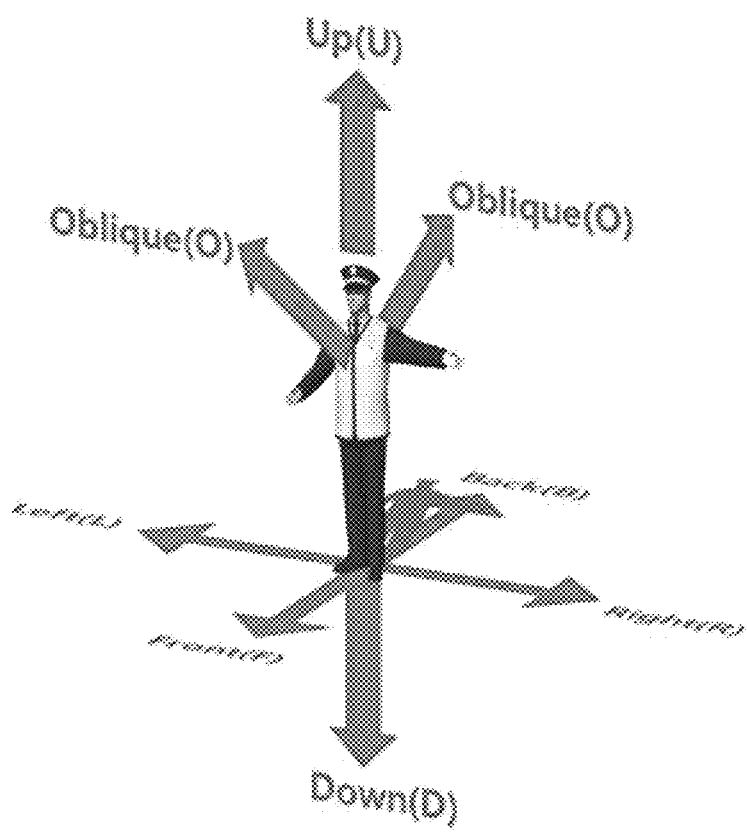
FIG. 2 is a conceptual diagram expressing an arm motion from a driver's point of view when a traffic hand signal motion is performed.

FIG. 2 is a conceptual diagram expressing an arm motion from a driver's point of view when a traffic hand signal motion is performed. Referring to FIG. 2, an arm motion according to an arm direction used in a traffic hand signal may be classified into a total of eight motions. That is, the arm motions representing the traffic hand signal include eight motions of front, back, left, right, up, down, oblique, and left and right.

Figure 3:
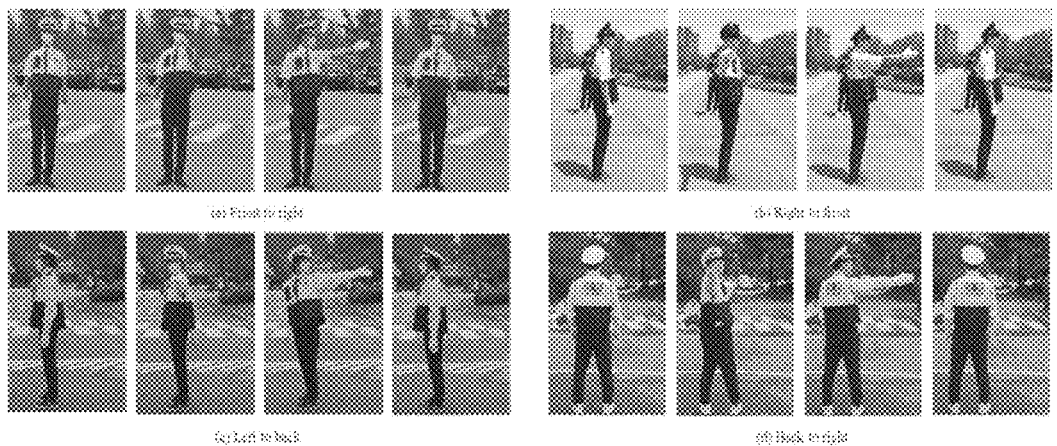
FIG. 3 is an image illustrating four types of hand signals from a driver's point of view.

FIG. 3 is an image illustrating four types of traffic hand signals from a driver's point of view. Traffic hand signals should be defined in a direction toward which an arm is directed from the driver's point of view, rather than the police's point of view. Referring to FIG. 3, four types of traffic hand signals for instructing a right turn may be indicated from the viewpoint of the driver receiving the signal. Regardless of the direction the police officer is facing, a direction of the arm that performs the hand signal will be toward the driver and then to the right, the next direction.

That is, regardless of the direction the police are looking, the traffic hand signal is completed by changing the direction the arm is pointing. In addition, based on the direction of the police's arm pointing to the driver as a signal, it may be determined whether the hand signal is for the driver or not. If a preceding motion points to the driver, it may be appreciated that the signal is valid for the driver. Otherwise, it is a signal for another driver in another direction, so the driver does not need to take any action. Accordingly, the traffic signal may be inferred from the direction of the police's arm and its sequence.

Figure 4:
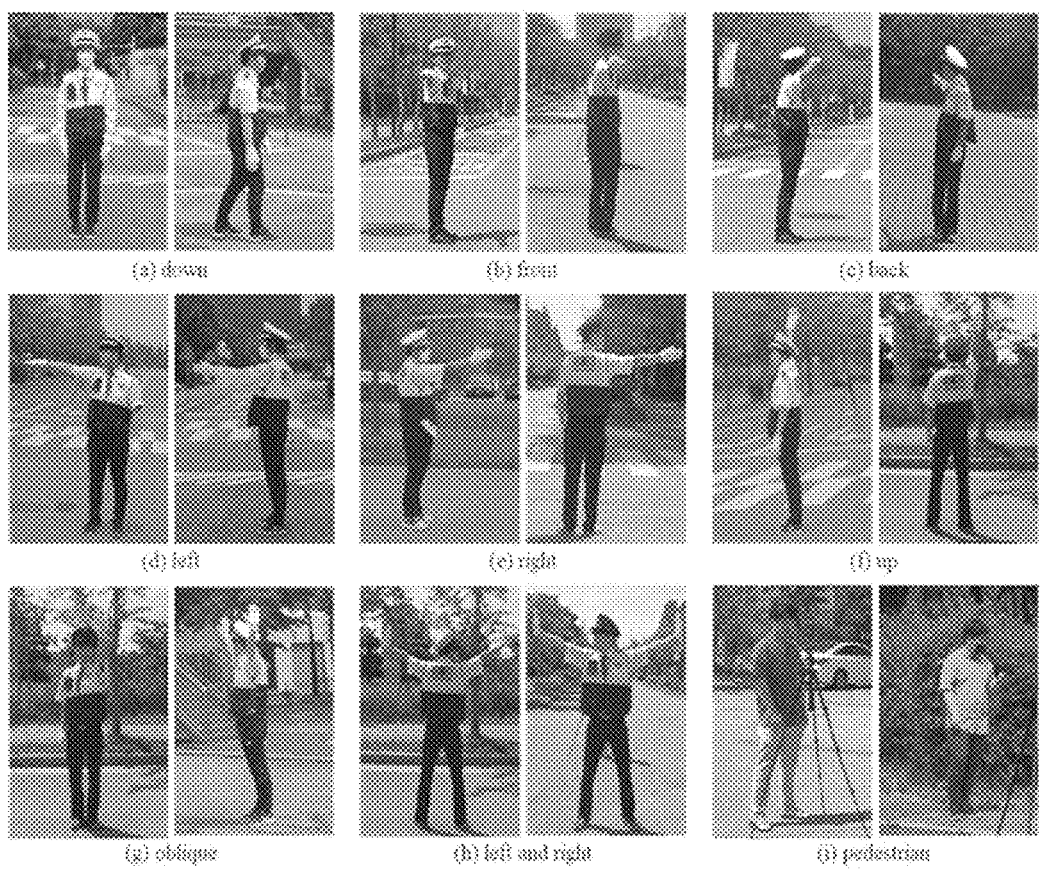
FIG. 4 is an image illustrating a photographed image of an arm direction motion constituting a traffic hand signal sequence.
Figure 5:
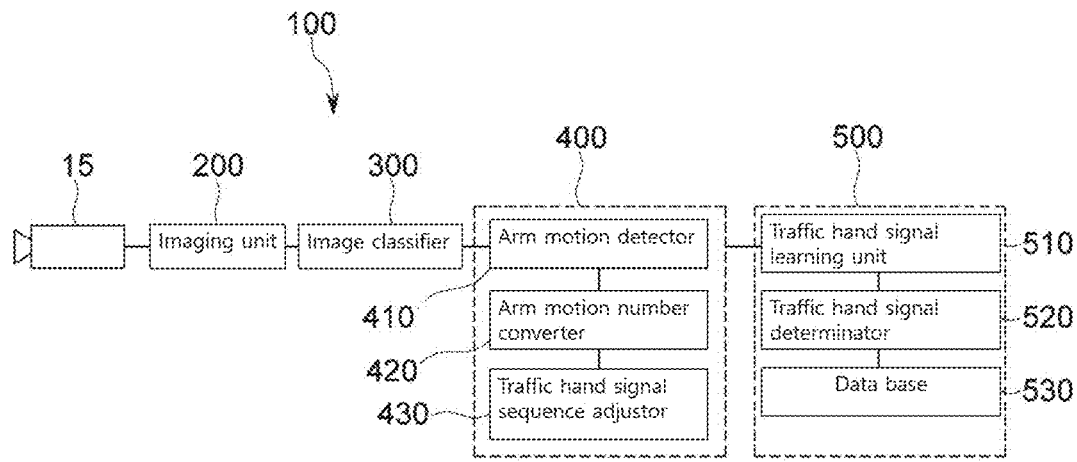
FIG. 5 is a block diagram illustrating a traffic hand signal detection system according to an embodiment of the present disclosure.
Figure 6:
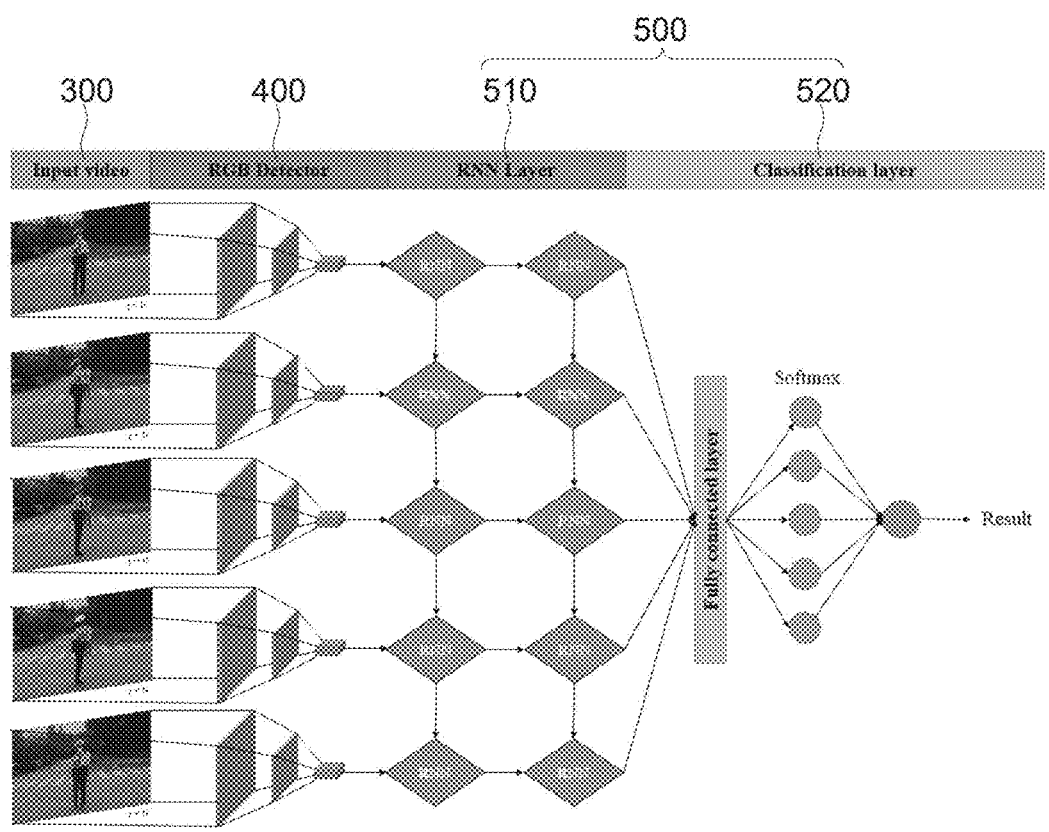
FIG. 6 is a conceptual diagram illustrating a neural network of a traffic hand signal detection system according to an embodiment of the present disclosure.

FIG. 4 is an image illustrating a photographed image of an arm direction motion constituting a traffic hand signal sequence. FIG. 5 is a block diagram illustrating the traffic hand signal detection system 100 according to an embodiment of the present disclosure. FIG. 6 is a conceptual diagram illustrating a neural network of a traffic hand signal detection system according to an embodiment of the present disclosure.

Referring to FIG. 5, the traffic hand signal detection system 100 includes an imaging unit 200 configured to acquire a photographed image from a camera 15 photographing a predetermined range; an image classifier 200 configured to classify an arm motion from the photographed image provided from the imaging unit by imparting a class; a detection module 400 configured to detect the arm motion from the photographed image classified by the image classifier 300 and generate a traffic signal sequence converted into a number; and an analysis module 500 configured to receive the traffic hand signal sequence from the detection module and determine a type of a traffic hand signal.

The imaging unit 200 is connected to the camera 15 to acquire a photographed image, that is, a photographed image of the front of the vehicle, from the camera 15. In such a case, the imaging unit 200 is preferably connected to the camera 15 through a wired or wireless communication network.

The imaging unit 200 photographs an image from before execution of a hand signal to after the execution of the hand signal, and photographs as one hand signal sequence.

Referring to FIG. 4, the image classifier 300 classifies into eight arm motions of down, front, back, left, right, up, oblique, left and right, and a pedestrian by imparting a class.

The image classifier 300 selects only an image taken from the front from among all the photographed images and annotates it as a front image. In addition, the image classifier 300 converts the traffic hand signal sequence into, for example, 15 images per second, and then performs a bounding box annotation on the arm motion based on the class of FIG. 4.

The image classifier 300 may classify an entire image into a training dataset and a test dataset at a ratio of 8:2 in order to train the detection module 400. In addition, the image classifier 300 distributes the training dataset into training data and validation data at a ratio of 8:2. For example, the number of classified images is shown in Table 1.

TABLE 1

| Signal | (a) | (b) | (c) | (d) | (e) | (f) | (g) | (h) | (i) | (j) | (k) | (l) | (m) | (n) | (o) | Total |
|---|---|---|---|---|---|---|---|---|---|---|---|---|---|---|---|---|
| Training | 5,470 | 3,700 | 3,764 | 3,681 | 5,768 | 3,952 | 4,322 | 4,148 | 4,369 | 3,819 | 4,340 | 3,960 | 4,193 | 3,984 | 3,969 | 63,439 |
| Valid | 1,367 | 924 | 940 | 920 | 1,442 | 988 | 1,080 | 1,037 | 1,092 | 954 | 1,084 | 990 | 1,048 | 995 | 992 | 15,853 |
| Test | 1,689 | 1,189 | 1,191 | 1,174 | 1,768 | 1,194 | 1,359 | 1,289 | 1,389 | 1,193 | 1,386 | 1,230 | 1,286 | 1,265 | 1,221 | 19,823 |

Table 2 shows an example of the number of classes of arm motions that the image classifier 300 classifies into training datasets and test datasets. Pedestrians who are not traffic signal performers have the largest number. Next was the number of down, which is a basic movement of lowering an arm. The number of left and right arm motions that stop the drivers left and right sides, not the driver, was the smallest, and the up arm motion, which appeared only in the signal indicating going straight, was the next smallest.

TABLE 1

| Signal | down | front | back | left | right | up | oblique | left and right | Pedestrian |
|---|---|---|---|---|---|---|---|---|---|
| Training | 40,123 | 7,100 | 8,227 | 7,299 | 6,090 | 3,448 | 4,324 | 2,764 | 104,683 |
| Test | 10,056 | 1,755 | 2,012 | 1,840 | 1,544 | 876 | 1,055 | 706 | 26,351 |

The detection module 400 detects the arm motion of the traffic hand signal from the classified photographed image, generates a traffic hand signal sequence obtained by converting the arm motion into a number, learns the traffic hand signal, and determines a type of the traffic hand signal. Referring to FIGS. 5 and 6, the detection module 400 includes an arm motion detector 410, an arm motion number converter 420, and a traffic hand signal sequence adjustor 430.

One traffic hand signal sequence may consist of about 100 images or so for each traffic hand signal motion frame from before a start of the hand signal to after an end of the hand signal.

The arm motion detector 410 detects the arm motion performed by the hand signal performer in the photographed image sequence classified by the image classifier 300 in order to classify the hand signal motion.

The arm motion detector 410 may be one of yolo v3 and yolo v4.

Here, yolo v4 improves the performance of yolo v3 by using the latest deep learning techniques such as BoF (Bag of Freebies) and BoS (Bag of Specials). Furthermore, yolo v4 uses Mosaic Data Augmentation which augments data by putting multiple classes in one image, and DropBlock Regularization which does not randomly out when executing DropOut and outs a predetermined range. In addition, yolo v4 prevents an overfitting problem by changing labels, which were previously expressed as 1 and 0, to a probability such as 0.1 and 0.9 using class label smoothing.

The arm motion number converter 420 converts each class in the detected arm motion image into numbers, for example, from 0 to 8 in order. That is, the arm motion number converter 420 assigns a number to the extracted arm direction image for each class. Referring to Table 3, the traffic hand signal may indicate go straight, turn right, turn left, stop, and an invalid signal with a combination of numbers of the arm direction.

TABLE 3

| Signal | Traffic hand signal | Arm motion |
|---|---|---|
| Go straight | (a) front to back<br>(g) right to left<br>(k) left to right | front(1) - up(5) - back(2) |
| Turn right | (b) front to left<br>(f) right to front<br>(l) left to back<br>(m) back to right | front(1) - right(4) |

TABLE 3-continued

| Signal | Traffic hand signal | Arm motion |
|---|---|---|
| Turn left | (c) Front to right<br>(h) right to back<br>(j) left to front<br>(n) back to left | front(1) - left(3) |

TABLE 3-continued

| Signal | Traffic hand signal | Arm motion |
|---|---|---|
| Stop | (d) front stop<br>(o) back stop<br>(f) front and back simultaneous stop | Oblique(6) |
| Invalid signal | (i) right and left simultaneous stop | left and right(7) |

The traffic hand signal sequence adjustor 430 generates six types of traffic hand signal sequences that are meaningful to the driver by combining numbers representing the classes of images indicating the arm direction. In addition, the traffic hand signal sequence adjustor 430 may randomly generate a class of an arm direction image within a predetermined range and add it to the traffic hand signal sequence. An arm direction label, which is detected by the arm motion detector 410 and assigned with a class, is cut to a predetermined length and is not transmitted when it is transmitted to the RNN, which is the traffic hand signal learning unit 510. Labels are delivered for each frame in a continuous stream. Accordingly, if a traffic signal action is taken after no action, there is a possibility that it may be classified as a completely different hand signal before the hand signal is even started. In order to prevent this, the traffic hand signal sequence adjustor 430 may generate a sequence consisting of only zeros with a random length. Additionally, the traffic hand signal sequence adjustor may generate a sequence in which a number other than a stop signal and a signal indicating the driver is appended quite shortly after a sequence of zeros.

A length of the generated sequence is from a minimum of 6 to a maximum of 91. An average length is 33.8 and a standard deviation is 9.4. Considering that the dataset is obtained at 15 frames/sec, it may be inferred that most of the hand signals occur between about 2 and 4 seconds.

The traffic hand signal sequence adjustor 430 randomly mixes the number-converted traffic hand signal sequence into training, validation, and test sets at a ratio of 6:2:2. In addition, the traffic hand signal sequence adjustor 430 adjusts a length of the traffic hand signal sequence. That is, when the traffic hand signal sequence is shorter than an input length, the traffic hand signal sequence adjustor 430 truncates the traffic hand signal sequence from the rear. On the other hand, when the sequence length is longer than the input length, zero padding is performed to fill the front part of the sequence with zeros.

Referring to FIGS. 5 and 6, the analysis module 500 includes a traffic hand signal learning unit 510, a traffic hand signal determinator 520, and a database 530.

The traffic hand signal learning unit 510 according to an embodiment of the present disclosure learns a pedestrian class and eight traffic hand signal classes according to the arm direction expressed in numbers. A hyper parameter has 100,000 iterations, 0.5 IoU, and 64 batch size. The traffic hand signal learning unit 510 performs learning with the training set and validity set of Tables 2 and 3. 100,000 iterations is about 80 epochs. As a result of learning, a final mAP was 91.3%.

showed stable learning up to layer 7, and it may be appreciated that the graph vibrates at layer 10.

[Table 4] shows an evaluation accuracy and a test accuracy of each RNN according to the number of hidden layers. A maximum test accuracy of each RNN is as follows: vanilla RNN: 89%, LSTM: 95.47%, Bi-LSTM: 95.79%, and GRU: 95.79%. Two algorithms with the highest test accuracy are Bi-LSTM with 4 hidden layers and GRU with 7 hidden layers. The least accurate RNN is vanilla RNN.

TABLE 4

| | GT | | | | | | | | | | | | | | | |
|---|---|---|---|---|---|---|---|---|---|---|---|---|---|---|---|---|
| | V-RNN | | | | LSTM | | | | Bi-LSTM | | | | GRU | | | |
| | Hidden layers | | | | | | | | | | | | | | | |
| | 2 | 4 | 7 | 10 | 2 | 4 | 7 | 10 | 2 | 4 | 7 | 10 | 2 | 4 | 7 | 10 |
| Evaluation accuracy (%) | 96.43 | 97.24 | 95.54 | 96.19 | 95.94 | 96.19 | 95.62 | 95.86 | 96.27 | 94.97 | 95.54 | 95.05 | 96.43 | 96.35 | 95.86 | 96.19 |
| Test accuracy (%) | 88.35 | 87.38 | 89.00 | 87.70 | 95.47 | 94.82 | 95.47 | 94.82 | 95.15 | 95.79 | 93.53 | 92.88 | 94.82 | 93.85 | 95.79 | 94.82 |

The traffic hand signal learning unit 510 includes RNN for a skeleton-based action recognition to analyze motion. In an embodiment, the traffic hand signal learning unit 510 may be one of Vanilla RNN, LSTM, GRU, and LSTM GRU.

RNN is a kind of deep learning model in which hidden nodes are connected with directivity to form a directed cycle. Vanilla RNN is a basic RNN model.

LSTM is a type of RNN and has more complex cells than Vanilla RNN. LSTM works well for longer input data compared to V-RNN. The most significant characteristic of LSTM is a cell state. LSTM is different from RNN which has one-layer repeating module, and LSTM has the function of determining memorizing and forgetting of information by adding three sigmoid layers. Bi LSTM refers to a network in which an LSTM layer that processes in a reverse direction is added to the existing LSTM in order to solve a data bottleneck that occurs in the LSTM. Since the reverse layer is added, end-to-end learning which may view the entire data input in chronological order is possible.

LSTM GRU is a neural network that serves the same role as LSTM with a sigmoid layer added to RNN, but improves computational efficiency by simplifying the structure of LSTM. Dissimilar to input and forget gates of LSTM, LSTM GRU includes a reset gate and an update gate, requiring only two sigmoid operations and one tanh operation.

FIGS. 7 to 10 are graphs comparing results of learning vanilla RNN, LSTM, Bi-LSTM, and GRU with an arm direction class sequence dataset extracted from traffic hand signals in order to select an optimal hand signal learning unit.

Referring to FIGS. 7 to 10, an input data length is 48, and when it is shorter than 48, zero padding is performed. The result of learning is shown in a graph, with a step size of 32, a batch size of 64, and the number of hidden layers changed to 2, 4, 7, and 10 with an epoch of 250.

Figure 7:
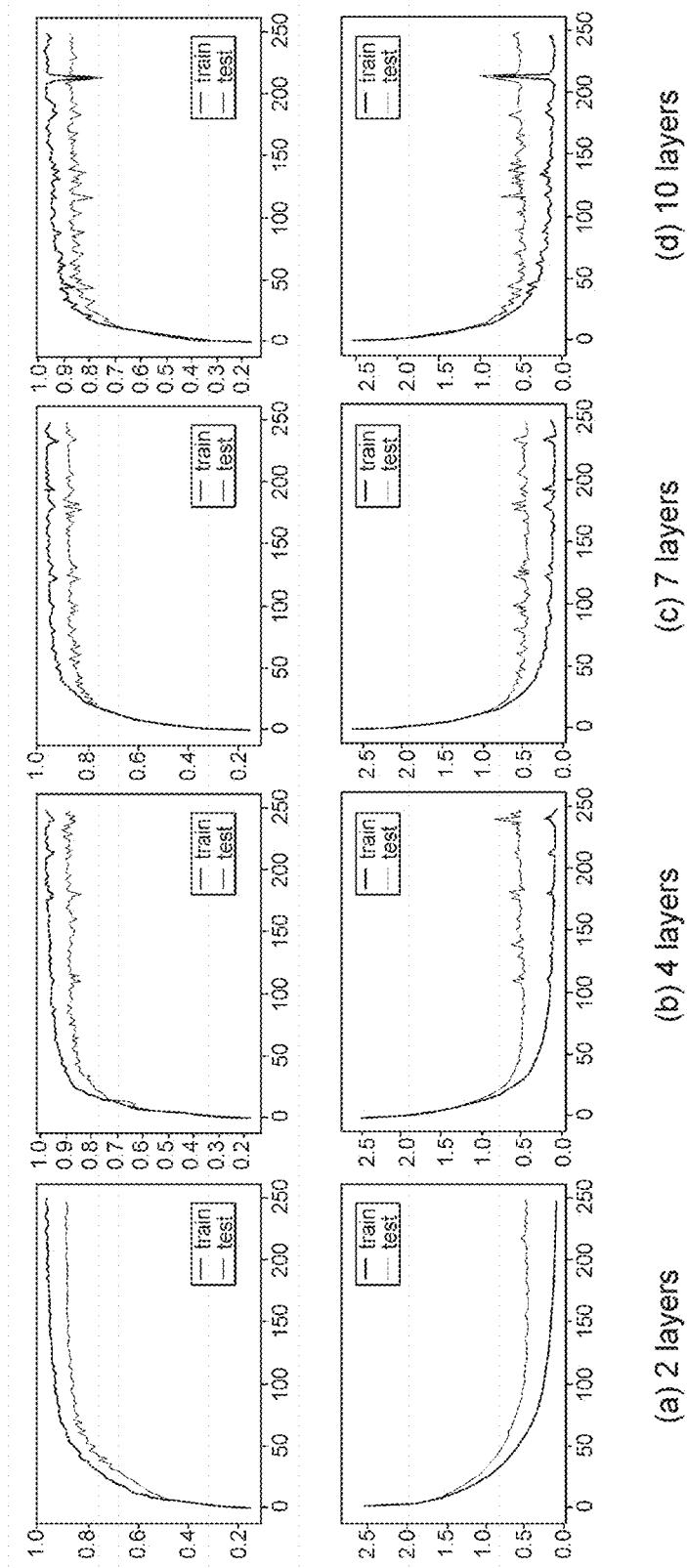
FIGS. 7 to 10 are graphs comparing results of learning vanilla RNN, LSTM, Bi-LSTM, and GRU with an arm direction class sequence dataset extracted from traffic hand signals in order to select an optimal hand signal learning unit.
Figure 8:
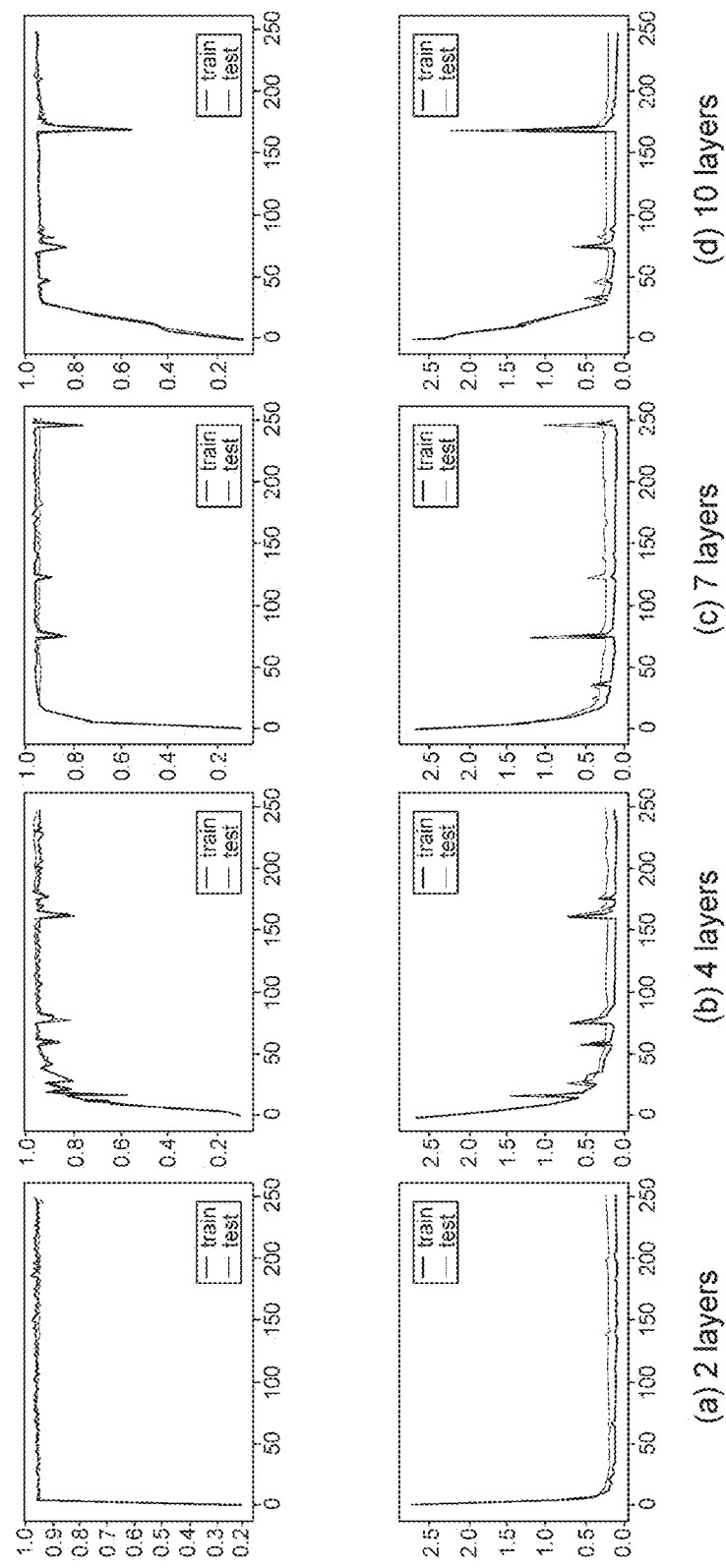
Figure 9:
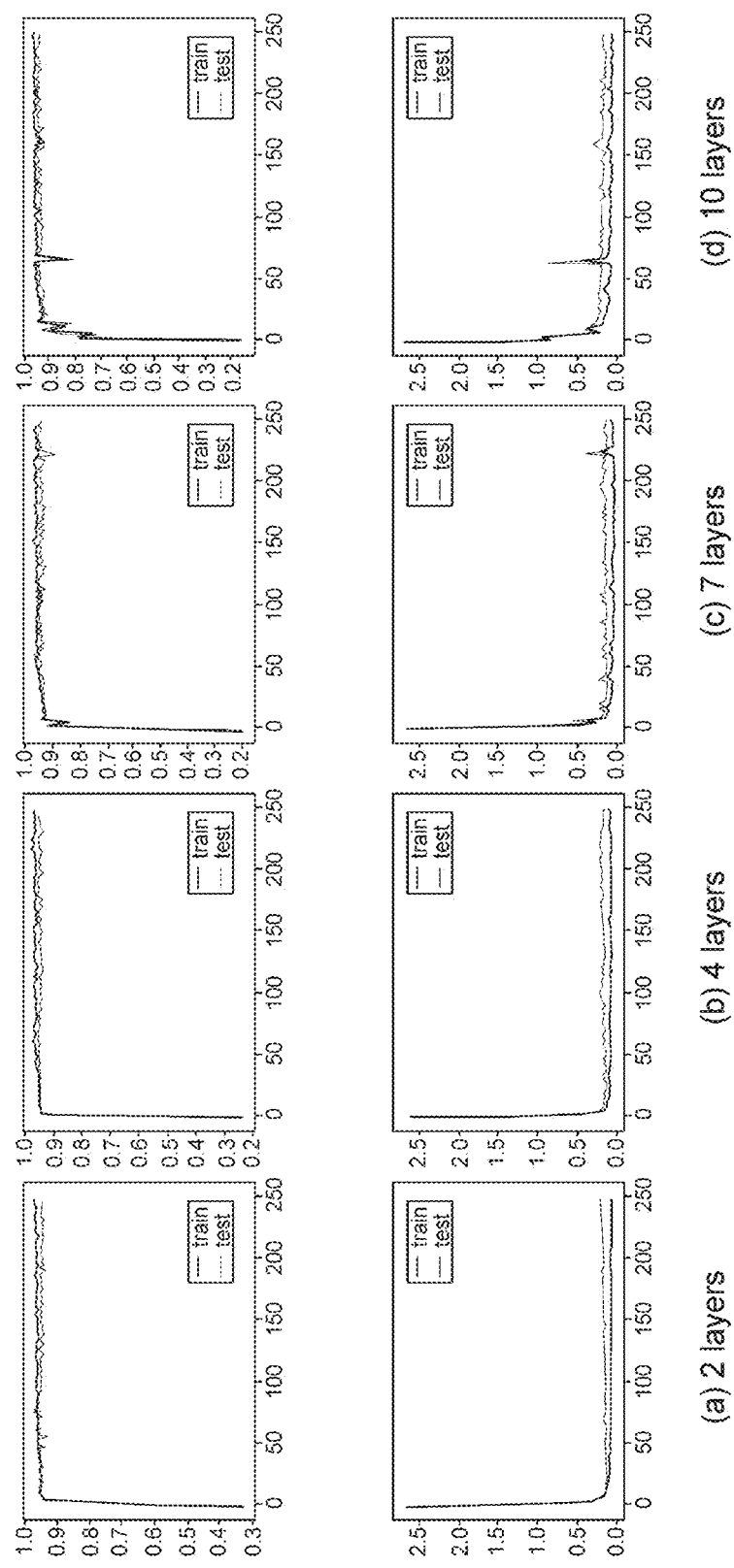
Figure 10:
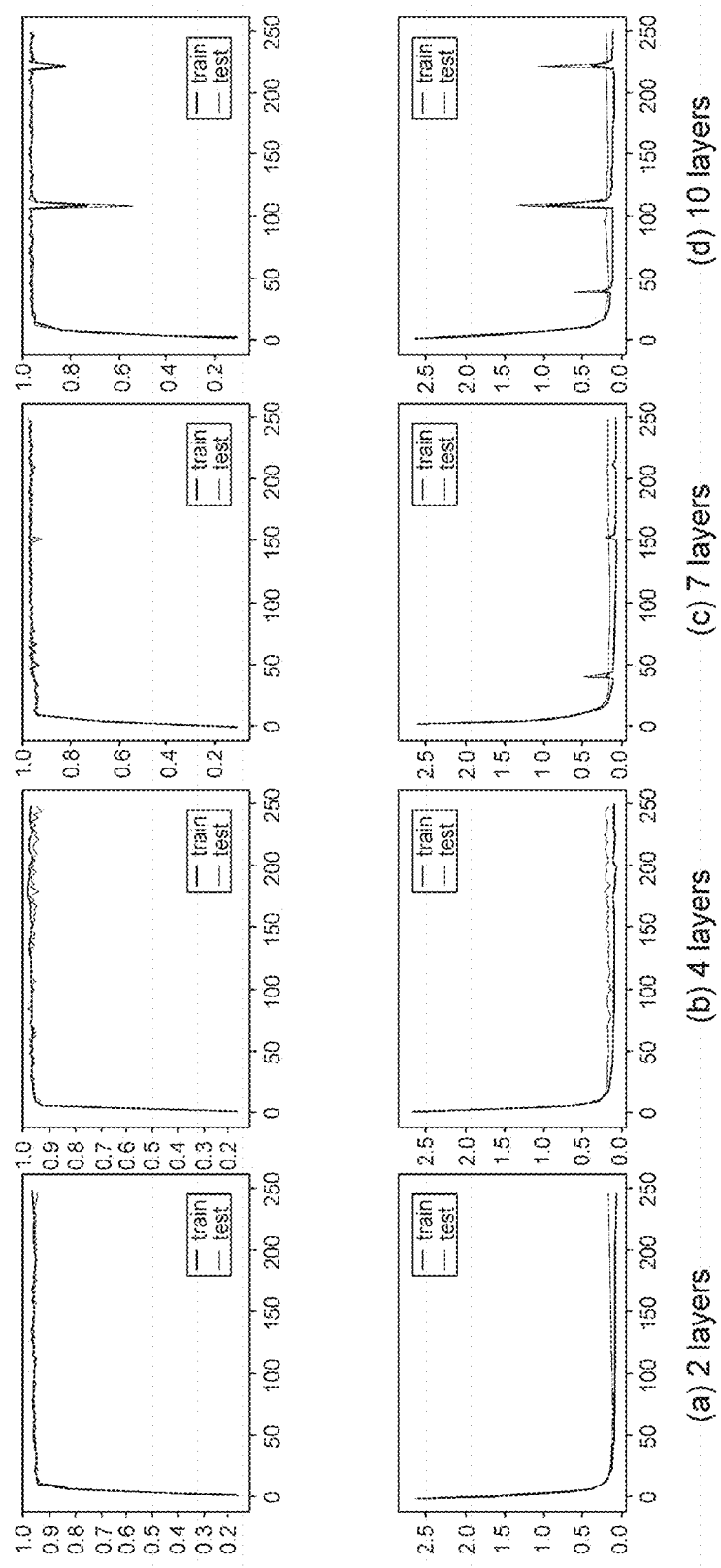

Referring to FIG. 7, it may be appreciated that the vanilla RNN has a relatively large difference in training, test, and validation compared to other RNN because it is the most basic RNN structure. It may be appreciated that as the number of hidden layers increases, vanilla RNN is overfitted to a greater extent. In the case of LSTM, referring to FIG. 8 (b), it may be appreciated that the graph fluctuates from when the number of hidden layers is 4. Bi-LSTM and GRU The traffic hand signal learning unit 510 preferably uses GRU of 7 hidden layers having the same accuracy but relatively fast operation speed, based on the trained result. FIG. 11 is an example illustrating a sequence input to the traffic hand signal learning unit and an output according to the order of time.

Referring to FIG. 11, when there is no initial action or when there is no hand signal performer, a 0 sequence is input, and a corresponding label is inactive. In the next frame, a front label 1 pointing to the driver is input. As the frame continues to be input, the next arm motion, up label 5, is input as in t=k. When the last arm motion, back label 2, is all input, the traffic hand signal learning unit 510 recognizes the traffic hand signal sequence as a go straight signal.

Figure 12:
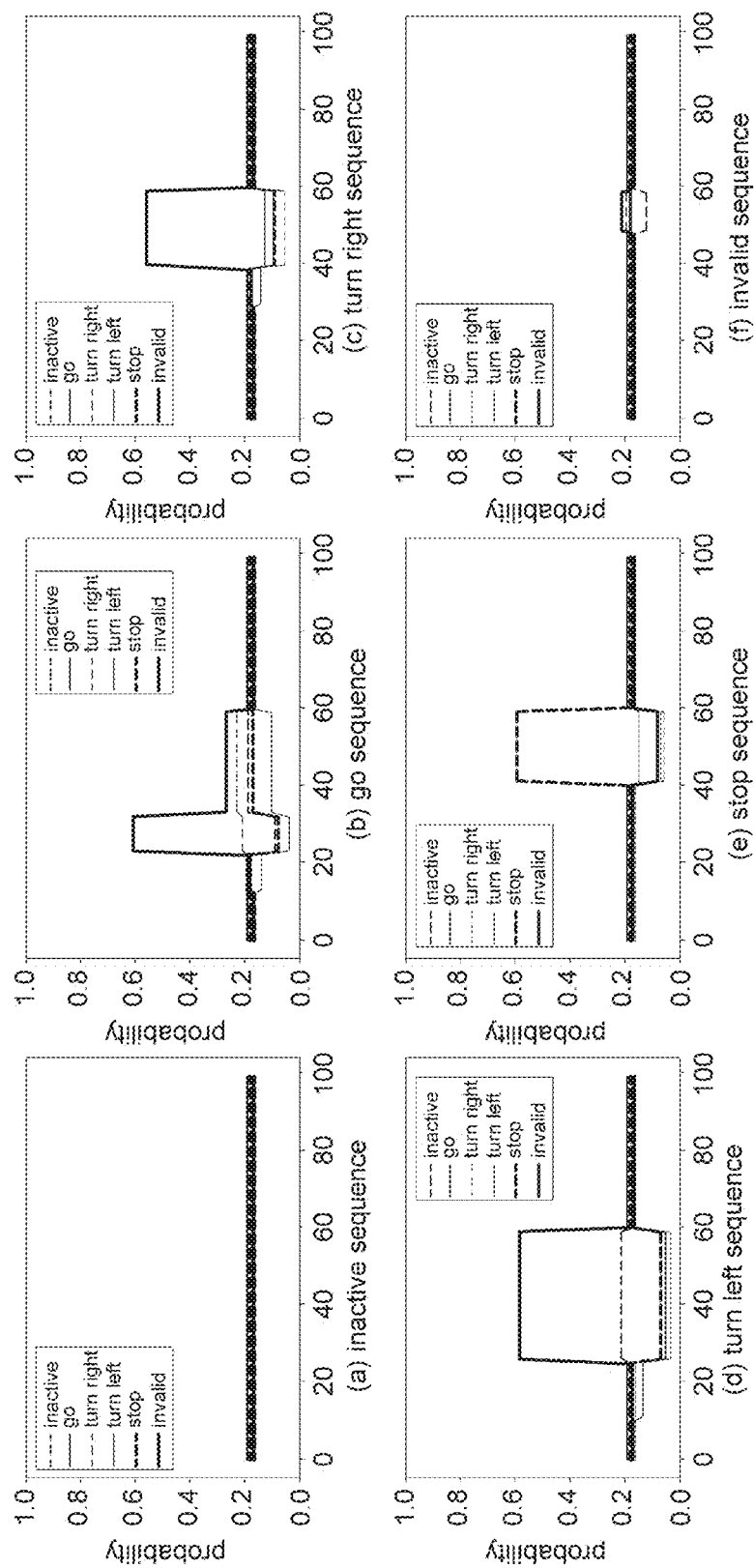
FIG. 12 is a graph illustrating a change in probability of 6 types of traffic hand signals according to frame progress with respect to 6 types of signals.

FIG. 12 is a graph illustrating a change in probability of 6 types of traffic hand signals according to frame progress with respect to 6 types of signals. Referring to FIG. 12 (a), it may be appreciated that a probability graph proceeds flat in an inactive sequence in which no action is performed. In the case of the go straight sequence, it may be appreciated that the probability corresponding to the go straight signal is highest at a point in time when the hand signal proceeds from being flat. Similarly, it may be appreciated that, when the traffic hand signals corresponding to the turn right, turn left, and stop sequences are in progress, corresponding probability increases, respectively. When a hand signal is recognized, it may be appreciated that the probability of the corresponding signal approaches 0.6.

Accordingly, in a case where the traffic hand signal sequence is used as an input by streaming the label, a threshold value is set, and when a signal is substantially equal to or greater than the threshold value, the traffic hand signal determinator 520 determines it as a traffic hand signal. The threshold value may be 0.4.

Both the inactive sequence and the invalid sequence do not signal to the driver. However, the probability graph shows a different pattern. Dissimilar to the probability graph of the flat inactive sequence, in the case of the invalid sequence, a change in value appears as the hand signal motion proceeds. Accordingly, the traffic hand signal determinator may determine a signal having a probability lower than 0.4, the threshold value, and higher than 0.2 as an invalid signal.

In order to evaluate the traffic hand signal learning unit 510, the traffic hand signal sequence adjustor 430 may be used to expand the data in advance. The traffic hand signal sequence adjustor 430 may generate 300 sequences and adjust them evenly according to the type of the traffic hand signal.

Table 5 shows an example of the sequence of the traffic hand signals extracted from the dataset. One number refers to one image of an arm direction, and a sequence consisting of only zeros indicates that no hand signal motion is performed, so it is regarded as no signal. There are total 15 types of traffic hand signals, but it is preferable to interpret the traffic hand signals from the driver's point of view.

TABLE 5

| Signal | Example of hand signal sequence | Original sequence | Artificial sequence | Total sequence |
|---|---|---|---|---|
| Go | 111111115552222222222222222222222222<br>1111111111111155555555552222222222222222222<br>11111111111155552222222222 | 100 | 1,100 | 1,200 |
| Turn right | 1111111111113333333333333333<br>11111111113333333333<br>1111111111133333333333333 | 100 | 1,100 | 1,200 |
| Turn left | 111111111144444444444444444<br>11111111111111111144444444444444444<br>11111111111111111111111111111444444444444444444 | 100 | 1,100 | 1,200 |
| Stop | 111111116666666666666<br>1111111116666666666666666666<br>666666666666666666 | 100 | 1,100 | 1,200 |
| Invalid signal | 222222222222222222222222<br>4444444444444444441111111111111111111<br>55555555555555555552222222222222222222 | 1,100 | 100 | 1,200 |
| Inactive signal | 000000000000000000000000000<br>000000000000000000000222222<br>000000000000000000000000000555 | 0 | 1,200 | 1,200 |
| Total | | 1,500 | 5,700 | 7,200 |

The traffic hand signal determinator 520 determines the type of the traffic hand signals for 15 signals as go straight, turn right, turn left, stop, an inactive signal in which the hand signal performer does not perform any action and an invalid signal in which the hand signal is not for the driver. Referring back to FIGS. 5 and 6, the traffic hand signal determinator 520 may include a fully connected layer and a softmax.

The traffic hand signal determinator 520 receives the number-converted traffic hand signal sequence from the detection module 400, passes it through the fully connected layer, and processes the result by softmax to determine the type of the traffic hand signal.

The traffic hand signal determinator 520 outputs a result determined as a go straight, turn right, turn left, or stop signal as a valid signal, and outputs an invalid signal when instructing another driver in a different direction and when a signal does not correspond to a traffic hand signal.

The database 530 stores information about the photographed traffic hand signal sequence image, the arm direction image extracted from the photographed image, and the traffic hand signal sequence expressed in numbers.

The traffic hand signal determinator 520 compares information on the traffic hand signal sequence provided from the detection module 400 with information stored in the database 530 and determines the type of the traffic hand signal included in the photographed image.

The traffic hand signal detection system 100 according to the present disclosure configured as described above may interpret the signal indicated by the traffic hand signal based on information on the traffic hand signal in the image photographed by the camera 15, such that the driver may be provided with information on the signal indicated by the traffic hand signal, and an autonomous vehicle may also recognize the signal indicated by the traffic hand signal.

FIG. 13 is a flowchart illustrating a traffic hand signal detection method using the traffic hand signal detection system 100 of the present disclosure.

Referring to FIG. 13, the traffic hand signal detection method includes an image acquisition step S100, an image classification step S200, an arm motion detecting step S300, and a traffic hand signal analysis step S400.

The image acquisition step S100 is a step of acquiring a photographed image from the camera 15 photographing a predetermined range. The imaging unit 200 connected to the camera 15 receives a photographed image from the camera 15.

The imaging unit 200 photographs an image from before the execution of the hand signal to after the execution, and collects one hand signal sequence.

In the image classification step S200, images taken from the front among the collected, photographed traffic hand signal images are classified according to the type of arm motions. The image classifier 300 converts the traffic hand signal sequence into 15 images per second, and then performs the bounding box annotation based on the class. In addition, the image classifier 300 classifies arm motions into eight types: down, front, back, left, right, up, oblique, and left and right.

The arm motion detecting step S300 is a step of detecting a motion of an arm direction from the photographed arm motion image obtained in the image classification step S200, assigning a class with a number in a range from 0 to 8 to the detected arm motion image, and generating a traffic hand signal sequence.

In the arm motion detector 410, an arm motion taken by the hand signal performer in the photographed image sequence classified by the image classifier is detected. The arm motion number converter 420 converts the class of the detected arm motion image into numbers.

In the detecting step 300, an arbitrary traffic hand signal sequence may be added to or deleted from the number-converted traffic hand signal sequence by the hand signal sequence adjustor 430.

The traffic hand signal analysis step S400 is a step of determining the type of the traffic hand signal corresponding to the number-converted traffic hand signal sequence based on the information detected in the detecting step S300.

The analysis step S400 includes a step of the traffic hand signal learning unit 510 learning the number-converted traffic hand signal sequence. The traffic hand signal determinator 520 receives the number-converted traffic hand signal sequence from the detection module 400, passes it through the fully connected layer, and processes the result by the softmax to determine the type of the traffic hand signal.

The traffic hand signal determinator 520 outputs a result determined as a go straight, turn right, turn left, or stop signal as a valid signal, and outputs an invalid signal when instructing another driver in a different direction and when a signal does not correspond to a traffic hand signal.

In a case where the label is streamed and the traffic hand signal sequence is used as an input, a threshold value may be set, and when a signal is substantially equal to or greater than the threshold value, the traffic hand signal determinator 520 determines it as a traffic hand signal. The threshold value may be 0.4.

The description of the presented embodiments is provided to allow any person skilled in the art to implement or use the present disclosure. Various modifications to these embodiments will be readily apparent to those skilled in the art, and the generic principles defined herein may be applied to other embodiments without departing from the scope of the present disclosure. Therefore, the present disclosure is not intended to be limited to the embodiments presented herein, but is to be construed in the widest scope consistent with the principles and novel features presented herein.

What is claimed is:

1. A traffic hand signal detection system comprising:
   an imaging unit configured to acquire a photographed image from a camera photographing a predetermined range;
   an image classifier configured to classify an arm motion from the photographed image provided from the imaging unit by imparting a class;
   a detection module configured to detect the arm motion from the photographed image classified by the image classifier and generate a traffic hand signal sequence as a combination of a plurality of numbers, each of the plurality of numbers representing a class of an arm direction image, the class of the arm direction image being defined in a direction toward which an arm is directed from the driver's point of view regardless of the direction a hand signal performer is looking; and
   an analysis module configured to receive the traffic hand signal sequence as the combination of the plurality of numbers from the detection module and determine a type of a traffic hand signal.

2. The traffic hand signal detection system of claim 1, wherein the detection module comprises:
   an arm motion detector configured to detect an arm motion performed by a hand signal performer in a photographed image sequence classified by the image classifier; and
   an arm motion number converter configured to convert the class of the detected arm motion image into the number.

3. The traffic hand signal detection system of claim 1, wherein the traffic hand signal sequence adjustor randomly generates the class of the arm direction image within a predetermined range and adds it to or deletes it from the traffic hand signal sequence.

4. The traffic hand signal detection system of claim 1, wherein the analysis module comprises:
   a traffic hand signal learning unit configured to learn the traffic hand signal sequence converted into the number; and
   a traffic hand signal determinator configured to receive the traffic hand signal sequence and determine the type of the traffic hand signal.

5. The traffic hand signal detection system of claim 4, wherein the traffic signal learning unit is one of Vanilla RNN, LSTM, GRU and LSTM GRU.

6. The traffic hand signal detection system of claim 4, wherein when a probability value of the traffic hand signal is 0.4 or more, the traffic hand signal determinator determines it as a corresponding traffic hand signal.

7. The traffic hand signal detection system of claim 4, wherein the traffic hand signal determinator comprises a fully connected layer and a softmax.

8. The traffic hand signal detection system of claim 1, wherein the analysis module further comprises a database configured to store information about the photographed traffic hand signal sequence image, the arm direction image extracted from the photographed image, and the traffic hand signal sequence as the combination of the plurality of numbers.

9. A traffic hand signal detection method comprising:
   an image acquiring step of acquiring a photographed image from a camera photographing a predetermined range;
   an image classifying step of classifying types of arm motions from the photographed image acquired in the image acquiring step;
   a detecting step of detecting an arm direction motion from the classified image and generating a traffic hand signal sequence as a combination of a plurality of numbers, each of the plurality of numbers representing a class of an arm direction image, the class of the arm direction image being defined in a direction toward which an arm is directed from the driver's point of view regardless of the direction a hand signal performer is looking; and
   an analysis step of determining a type of a traffic hand signal corresponding to the traffic hand signal sequence as the combination of the plurality of numbers based on information detected in the detecting step.

10. The traffic hand signal detection method of claim 9, wherein the detecting step further comprises adding or deleting an arbitrary traffic hand signal sequence to the traffic hand signal sequence.

11. The traffic hand signal detection method of claim 9, wherein the detecting step comprises learning the traffic hand signal sequence as the combination of the plurality of numbers.

12. The traffic hand signal detection method of claim 9, wherein in the analysis step, when using the traffic hand signal sequence as an input, if a signal is substantially equal to or more than a threshold value, the signal is determined as the traffic hand signal.

* * * * *